US006735382B2

(12) United States Patent
Schneider

(10) Patent No.: US 6,735,382 B2
(45) Date of Patent: May 11, 2004

(54) PRESSURIZED CAMERA HOUSING

(75) Inventor: Peter G. Schneider, Decatur, GA (US)

(73) Assignee: Videolarm, Inc., Decatur, GA (US)

( * ) Notice: Subject to any disclaimer, the term of this patent is extended or adjusted under 35 U.S.C. 154(b) by 27 days.

(21) Appl. No.: 10/239,440

(22) PCT Filed: Apr. 3, 2001

(86) PCT No.: PCT/US01/10616

§ 371 (c)(1),
(2), (4) Date: Sep. 20, 2002

(87) PCT Pub. No.: WO01/75833

PCT Pub. Date: Oct. 11, 2001

(65) Prior Publication Data

US 2003/0053806 A1 Mar. 20, 2003

Related U.S. Application Data

(63) Continuation of application No. 09/566,822, filed on May 8, 2000.

(60) Provisional application No. 60/194,919, filed on Apr. 4, 2000.

(51) Int. Cl.[7] .................................... G03B 17/08

(52) U.S. Cl. ....................... 396/26; 396/427; 348/143

(58) Field of Search ......................... 396/25, 26, 427, 396/429; 348/82, 84, 143

(56) References Cited

U.S. PATENT DOCUMENTS 685,463 A 10/1901 Watkins
3,879,742 A 4/1975 Smith
4,113,137 A * 9/1978 Wind ....................... 220/319
4,320,949 A 3/1982 Pagano
D275,294 S 8/1984 Pagano
4,618,886 A 10/1986 Mooney
4,651,144 A 3/1987 Pagano
4,652,930 A 3/1987 Crawford
4,796,039 A 1/1989 Pagano
4,860,038 A 8/1989 Thatcher et al.
4,890,713 A 1/1990 Pagano
4,920,367 A 4/1990 Pagano
D307,759 S 5/1990 Pagano
5,107,286 A 4/1992 Sergeant et al.
5,223,872 A 6/1993 Stiepel et al.
5,224,675 A 7/1993 Ellenberger et al.
5,240,220 A 8/1993 Elberbaum
5,394,184 A 2/1995 Anderson et al.
5,394,209 A 2/1995 Stiepel et al.
5,418,567 A 5/1995 Boers et al.
5,689,304 A 11/1997 Jones et al.
5,689,734 A 11/1997 Bauer et al.
5,765,043 A 6/1998 Tyler
5,852,754 A 12/1998 Schneider
5,940,122 A 8/1999 Kizawa et al.
6,354,749 B1 3/2002 Pfaffenberger, II
6,375,369 B1 4/2002 Schneider et al.

* cited by examiner

*Primary Examiner*—David M. Gray
(74) *Attorney, Agent, or Firm*—Gardner Groff, P.C.

(57) ABSTRACT

A pressurizable camera housing of a surveillance camera. The housing includes a transparent dome, an upper housing shell, and an upper sealing plate. The components are separable for access to the housing interior for installation and maintenance purposes. O-ring seals are provided between the separable components for maintaining pressure within the housing. A pivotal mounting bracket includes a hinged portion allowing access to wiring, circuitry and other components behind the bracket.

21 Claims, 5 Drawing Sheets

PRESSURIZED CAMERA HOUSING

CROSS-REFERENCE TO RELATED APPLICATIONS

This application is a 371 of PCT/US01/10616, filed Apr. 3, 2001.

This application claims the benefit of U.S. Provisional Patent Application Serial No. 60/194,919, filed Apr. 4, 2000, and U.S. patent application Ser. No. 09/566,822, filed May 8, 2000, the entire scope and content of which applications are hereby incorporated by reference herein. PCT/US01/10616 is a continuation of application Ser. No. 09/566,822.

BACKGROUND OF THE INVENTION

1. Field of the Invention

The present invention relates generally to a housing for a surveillance camera, and more particularly to a pressurizable housing for a surveillance camera having an improved pressure sealing and interior access arrangement.

2. Description of Related Art

Surveillance cameras are widely used for security and monitoring purposes. A protective housing often encloses a surveillance camera to protect the camera from damage by the elements, to prevent vandalism, to conceal the camera, and/or for aesthetic purposes. Such housings can be domed, shaped to generally match the camera contours, or otherwise configured. The camera and housing are typically mounted to a wall, ceiling or support structure, and electronically coupled to a power source and a remote monitoring and/or recording station.

It has been found advantageous in certain applications to pressurize the housing of a surveillance camera for improved protection against the elements. For example, a pressurized gas such as dry nitrogen can be introduced to a sealed housing to prevent the intrusion of moisture, dust, insects and other potential contaminants or debris. U.S. Pat. No. 5,852,754 to Schneider, which is incorporated herein by reference, discloses an example embodiment of a pressurized camera housing.

It is desirable that the interior of a camera housing be easily accessible for installation, service and maintenance purposes. Therefore, known housings typically permit partial disassembly or removal of structural components for access to the housing interior. In order to permit pressurization, known pressurized camera housings typically incorporate O-rings, gaskets, or other sealing elements to prevent pressure loss between their separable structural components. Each sealing point, however, presents a potential avenue for pressure loss and debris introduction. Therefore, it is desirable to maintain the number of sealing points at a minimum. The pressurized camera housing disclosed by U.S. Pat. No. 5,852,754 performs well in many applications. This housing, however, requires a rigid assembly plate, to which the lower dome and upper enclosure are separately sealed. The assembly plate and the necessity of separate seals for the lower dome and the upper enclosure contribute significantly to the expense of the housing, both in material costs and labor. The assembly plate also adds weight to the housing, which may render installation and maintenance more difficult than would optimally be desired. In addition, the assembly plate of this housing is typically supported by a mounting bracket, which supports the housing from the rear side thereof. In many instances, however, it is desirable to provide a top-mounting housing that is supported from above.

It has therefore been found that a need exists for an improved camera housing that is pressurizable, simple and economical in construction, aesthetically attractive, and durable in use. It is also desirable that the camera housing be lightweight and permit easy access to the interior thereof, while minimizing the number of sealing points necessary. It is also desirable to provide a camera housing that is readily adaptable for top-mounting. It is to the provision of a camera housing meeting these and other needs that the present invention is primarily directed.

SUMMARY OF THE INVENTION

The present invention provides an improved camera housing capable of maintaining a positive pressure gradient between its internal volume and the surroundings. The camera housing facilitates easy access to the interior thereof, and provides an efficient sealing arrangement. The camera housing advantageously eliminates the need for a rigid assembly plate, and instead provides a seal between the first and second housing shells. Alignment of the seal location with wall portions of the first and second housing shells In one aspect, the present invention is a pressurizable camera housing including a first housing element having a transparent dome with a flange extending therefrom, a second housing element having a rim releasably coupled to the flange of the first housing element, and a first O-ring engaged between the flange of the first housing element and the rim of the second housing element. The housing preferably further includes a sealing plate engaged within an opening through the second housing element, whereby the first housing element, the second housing element, and the sealing plate define an interior chamber. The housing preferably further includes a second O-ring engaged between the sealing plate and the second housing element. A hermetic electrical coupling is preferably included for conducting an electrical signal between the interior chamber and an external element. The housing preferably also includes means for introducing a pressurized fluid into the interior chamber.

In another aspect, the present invention is a pressurizable camera housing including a first housing shell having a transparent portion, and a second housing shell removably attached to the first housing shell, whereby an airtight seal is provided between the first and second housing shells.

In another aspect, the present invention is a pressurizable housing including a first housing shell that is at least partially transparent; a second housing shell adapted to engage the first housing shell, whereby the first and second housing shells bound an interior chamber; and sealing means between the first and second housing shells. The housing preferably also includes means for introducing pressure to the interior chamber, and means for mounting a camera within the interior chamber.

These and other features and advantages of preferred forms of the present invention are described in greater detail herein with reference to preferred and example embodiments.

DETAILED DESCRIPTION

Figure 1:
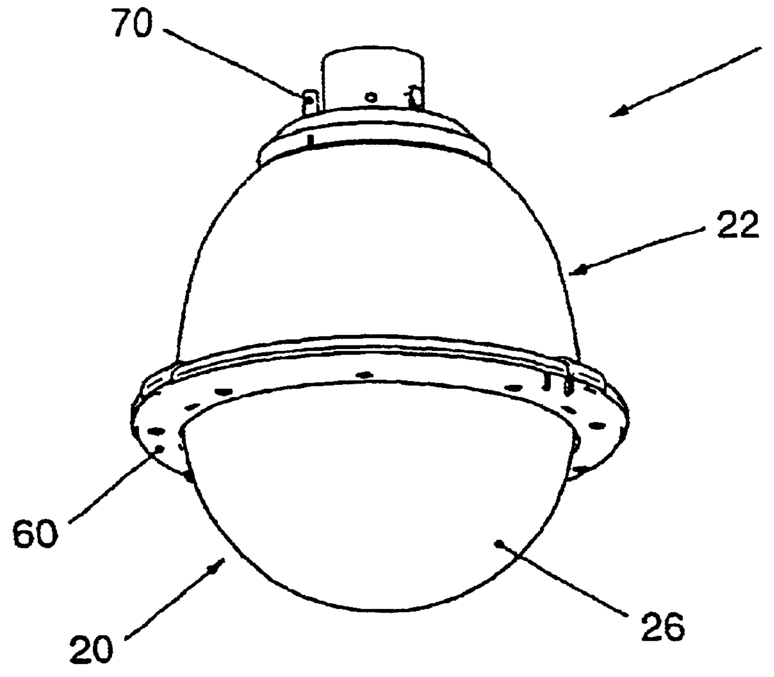
FIG. 1 shows a perspective view of a camera housing according to a preferred form of the present invention.

Referring now to the drawing figures, wherein like reference numerals represent like parts throughout, preferred forms of the present invention will now be described. The present invention is a housing 10 for containing and protecting a surveillance camera or other object. The housing 10 preferably comprises a sealed enclosure surrounding an interior chamber 12 configured to accommodate a surveillance camera. The sealed enclosure preferably permits easy access to its interior chamber 12 for installation, repair and maintenance purposes. The enclosure is preferably airtight and pressurizable, so that a pressurized fluid can be introduced into the interior chamber 12, and a positive pressure gradient maintained between the interior chamber and the ambient external atmosphere surrounding the enclosure. By pressurizing the interior chamber 12 with a clean, dry gas, such as nitrogen or air, contaminants such as moisture, dust, insects and debris are excluded from entry into the enclosure, thereby reducing maintenance needs, improving performance, and/or prolonging the life of the camera and associated equipment.

Figure 3:
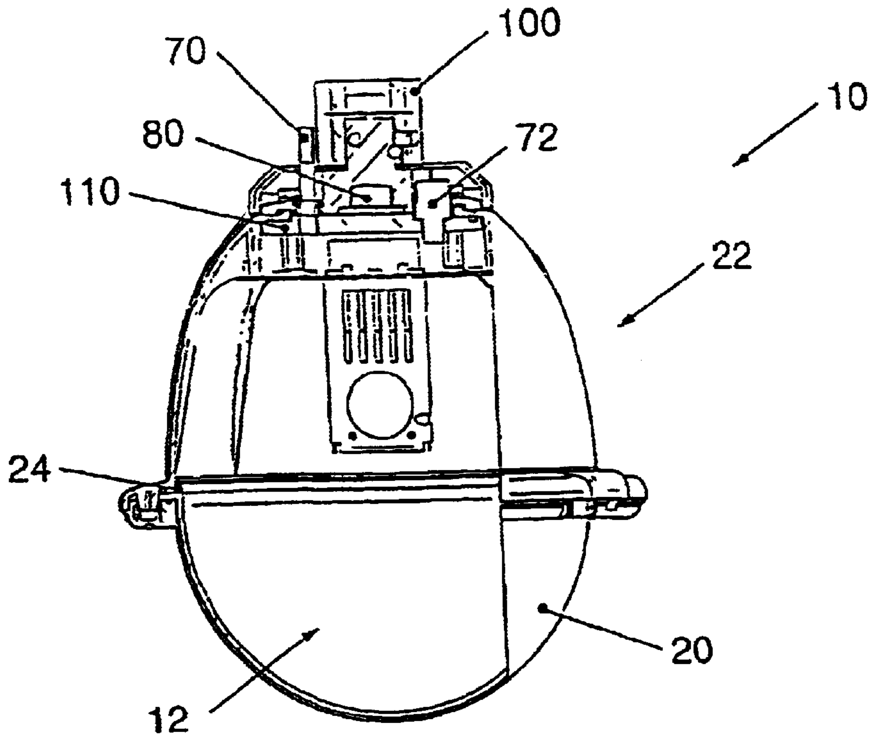
FIG. 3 shows a side view of the camera housing of FIG. 1, in partial cutaway view to show internal components.
Figure 7A:
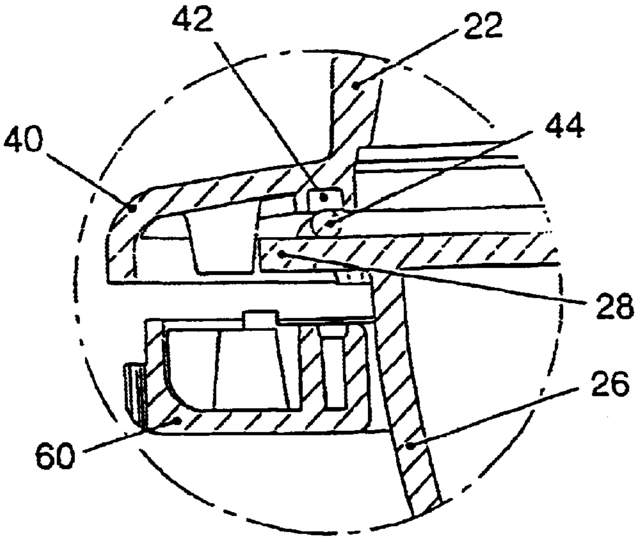
FIGS. 7*a* and 7*b* show cross-sectional details of a sealing arrangement between the upper and lower housing shells of the camera housing of FIG. 1, according to a preferred form.
Figure 7B:
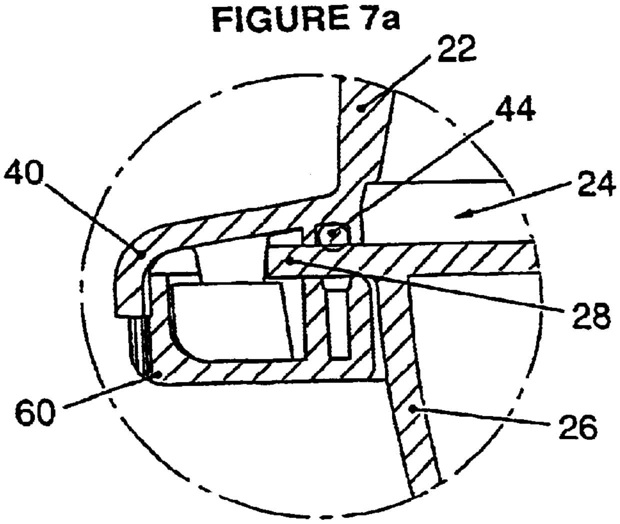

As seen best with reference to FIGS. 1, 3 and 7, the housing 10 of the present invention preferably generally comprises a first housing element or shell 20, a second housing element or shell 22, and an airtight seal 24 between the first and second housing shells, which cooperate to form a sealed enclosure about the interior chamber 12. The first housing shell 20 preferably includes a transparent portion through which the camera obtains an image. Most preferably, the transparent portion comprises a dome 26 of generally hemispherical shape, and fabricated from a substantially rigid clear or tinted material such as acrylic. Alternatively, the transparent portion can comprise a conical or irregularly-shaped dome, or a transparent panel. The first housing shell 20 preferably further comprises a flange 28 for engagement with the seal 24 and connection with the second housing shell 22. The flange 28 preferably projects circumferentially outwardly from the dome 26, presenting a generally flat, planar upper face for direct airtight contact with the seal 24. The flange 28 is preferably integrally formed with the dome 26 as a single component. The dome portion 26 of the first housing shell 20 and at least that portion of the flange 28 inward of the line of contact with the seal 24 preferably comprise a continuous unperforated piece, with no openings through which air or other material can pass.

The second housing shell 22 preferably is generally dome-shaped, and has an outer circumference approximately equal to that of the first housing shell 20. The second housing shell 22 can be generally hemispherical or conical, and its height and diameter may vary as required to accommodate the camera and/or other equipment to be housed within the housing 10. In alternate forms, the second housing shell 22 can comprise an irregularly-shaped shell or panel. The second housing shell 22 preferably comprises a rim 40 projecting generally circumferentially therefrom. The rim 40 preferably comprises a circumferential groove 42 for retaining an O-ring 44 forming the seal 24 between the first and second housing shells 20,22. The second housing shell 22 is preferably fabricated from plastic, aluminum, or other substantially rigid material.

As shown in FIG. 7, the seal 24 preferably comprises an O-ring 44 formed of neoprene, rubber or other compressible material. The O-ring 44 is preferably placed in compression by contact with the first housing shell 20 and the second housing shell 22, thereby forming an airtight, hermetic seal between the first and second housing shells. In a particularly preferred embodiment, the O-ring is compressed between the flange 28 of the first housing shell 20 and the rim 40 of the second housing shell 22 immediately adjacent the intersection of the dome 26 and the flange 28 of the first housing shell. In this location, the dome 26 provides structural reinforcement against flexure of the flange, as might occur if the O-ring were located toward the free edge of the flange 28. The wall structure of the second housing shell 22 also provides structural reinforcement against flexure of the rim 40 at this sealing location. The additional structural rigidity provided by alignment of the seal 24 with the walls of the dome 26 and the second housing shell 22 in this manner advantageously improves the integrity of the seal by minimizing any potential deflection of the contacting surfaces of the first and second housing shells 20, 22 with the O-ring 44. Accordingly, a single O-ring 44 effectively forms an airtight seal directly between the first and second housing shells 20, 22, without the need for a rigid assembly plate as utilized in previously known housing devices.

Figure 5:
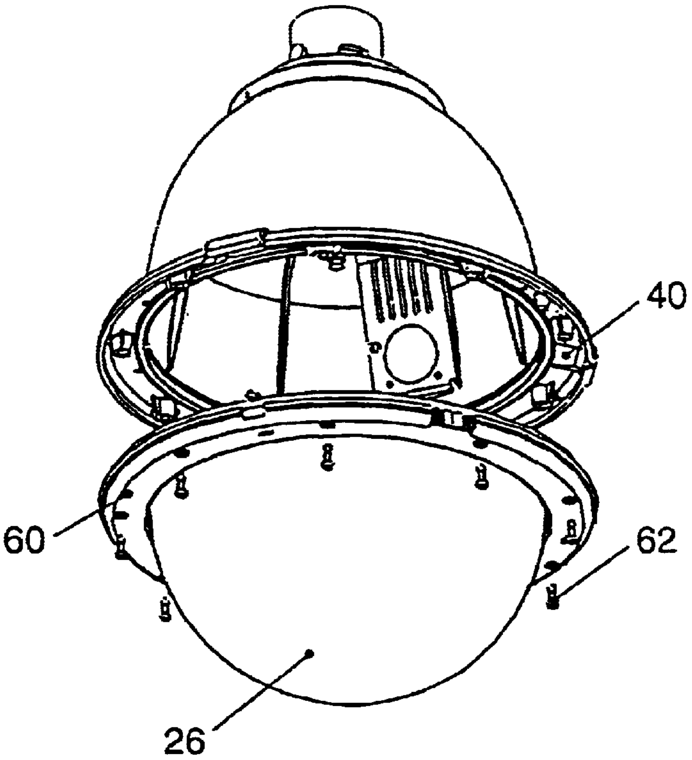
FIG. 5 shows a partially exploded view of the camera housing of FIG. 1, with the lower housing shell separated from the upper housing shell.

The first and second housing shells 20, 22 are preferably releasably coupled to one another to permit access into the interior chamber 12. As shown in FIGS. 1, 5 and 7, a retaining ring 60 preferably receives the dome 26 of the first housing shell in its central opening. The flange 28 does not pass through the opening of the retaining ring, thereby constraining the first housing shell 20 within the retaining ring 60. The retaining ring 60 is in turn attached to the rim 40 of the second housing shell 22 by screws, clips, threaded connection, or other releasable fastening means, with the flange 28 of the first housing shell 20 engaged between the retaining ring and the rim. In a particularly preferred embodiment, the retaining ring 60 and the second housing shell 22 comprise one or more interengaging projections and recesses that permit the ring 60 to be twisted or otherwise manipulated into engagement with the shell 22 and held in place while a plurality of screws 62 are tightened through openings in the ring and into threaded openings in the rim 40 to engage the seal and complete the attachment of the first and second housing shells. The screws 62 are tightened sufficiently to compress the O-ring slightly and form an airtight seal. The retaining ring 60 provides additional structural rigidity to the housing 10 in the region of the seal 24, resulting in more evenly distributed compression of the O-ring 44 and an improved sealing arrangement. To disassemble the housing for access to the interior chamber, the screws 62 are loosened out of engagement with the threaded openings in the rim 40, and the ring 60 is twisted or otherwise manipulated out of engagement with the shell 22. The retaining ring 60 preferably includes one or more thumb grooves to assist the user in placement on the second housing shell. A lanyard preferably connects the retaining ring 60 to the upper housing shell 22 to facilitate retrieval of the retaining ring 60 and the lower housing shell 20 for reassembly, and the screws 62 are preferably captive within the openings through the ring 60 to prevent their misplacement.

The housing 10 preferably further comprises means for introducing a pressurized gas into the interior chamber 12. For example, an opening through the housing 10 is preferably fitted with a valve 70, such as a tire-type Schraeder or Dill valve, which permits the inlet of a gas such as dry nitrogen, air or other fluid into the housing, and which prevents or only selectively permits the discharge of gas therefrom. The valve preferably comprises an external fitting capable of engagement with a cooperating fitting of an external source of pressurized fluid. A pressure relief valve 72 is preferably also provided for releasing excess pressure from the housing 10. For example, the pressure relief valve 72 can be configured to remain closed in normal operation, and to open when the pressure within the interior chamber 12 reaches or exceeds a predetermined level (typically about 3–5 p.s.i.) to release fluid from the interior chamber 12 until the pressure within the interior chamber drops back down to the predetermined level.

The housing preferably further comprises a hermetically sealed or pressure sealed electrical coupling 80 for conducting an electrical signal between the interior chamber 12 and an external element. For example, a hermetic coupling 80, such as for example a 10-pin, hermetically sealed coupling manufactured by Souriau, can be provided to conduct power and control signals from an external power source and/or control station to a camera, an associated drive mechanism, a heater and/or a blower within the housing; and to conduct video signals from the camera to an external monitoring and/or recording station. The hermetic coupling preferably prevents pressure loss from within the interior chamber 12 and facilitates connection and disconnection of equipment for installation, repair and maintenance purposes.

Figure 4:
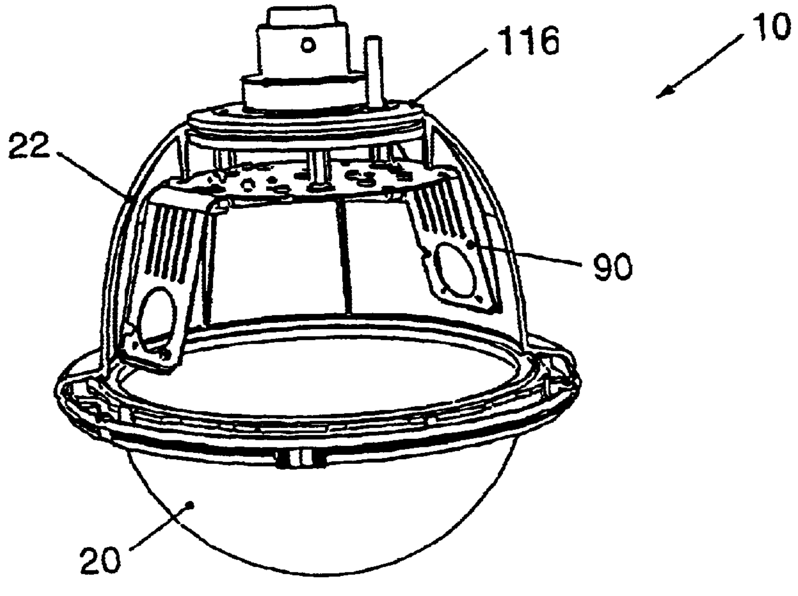
FIG. 4 shows a perspective view of the camera housing of FIG. 1, with a portion of the upper housing shell removed to show internal components.
Figure 9A:
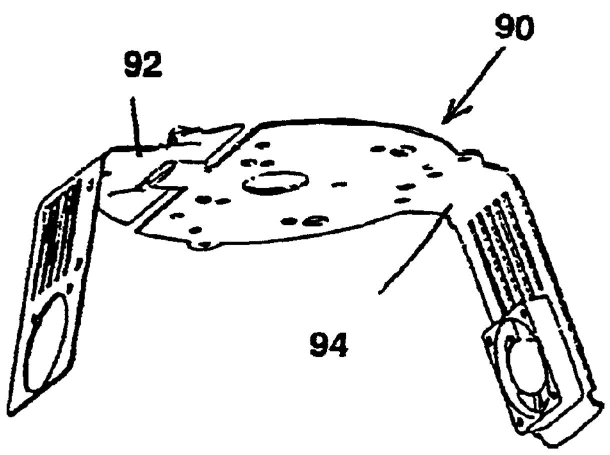
FIGS. 9*a* and 9*b* show a pivot mount portion of the camera housing of FIG. 1, according to a preferred form.
Figure 9B:
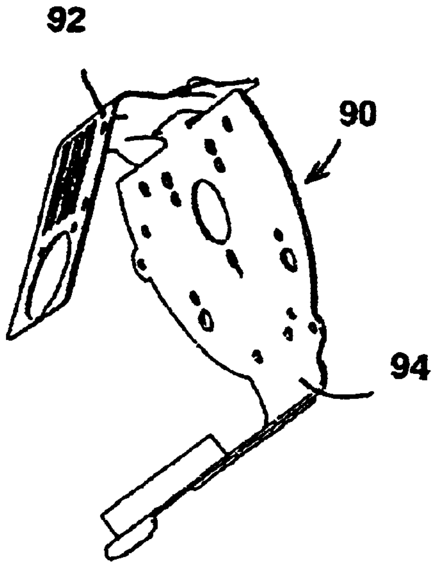

As seen best with reference to FIGS. 4 and 9, the housing 10 of the present invention preferably further comprises a mounting bracket 90 for a camera housed within the interior chamber 12. The mounting bracket 90 is preferably a universal bracket capable of accommodating a variety of camera types and their associated pan-and-tilt drive mechanisms. In a particularly preferred form, the mounting bracket 90 is pivotal to permit improved access to wiring, circuit board, and other equipment commonly installed above the mounting bracket, thereby facilitating easier repair and installation. The mounting bracket 90 preferably comprises a fixed portion 92, a pivotal portion 94, and a hinge 96 pivotally connecting the pivotal portion to the fixed portion. The hinge 96 can comprise interengaging elements of the fixed portion 92 and the pivotal portion 94, a pin-and-clevis hinge, or other type of pivotal connection. Each of the fixed portion 92 and the pivotal portion 94 preferably comprise a base panel having an arm extending outwardly at an angle therefrom. In a first position (FIG. 9*a*), the base panels of the fixed portion 92 and the pivotal portion 94 are generally coplanar, and form a base for attachment to the remainder of the housing, as by screws or other fasteners attaching the mounting bracket to the sealing plate 110 (described below). The base panel of the fixed portion 92 typically remains attached to the sealing plate or other part of the housing. The base panel of the pivotal portion 94 can be detached from the sealing plate or other part of the housing, typically by loosening one or more screws or other fasteners, thereby allowing the pivotal portion to swing pivotally into a second position (FIG. 9*b*) providing access to equipment behind the mounting bracket 90. It is preferred that the screws or other fasteners used to attach the base panel of the pivotal portion 94 to the sealing plate or other part of the housing be captive within the base panel, in order to prevent loss of the fasteners. Preferably, the size of the base panel of the fixed portion 92 is small relative to the base panel of the pivotal portion 94, so that access to equipment behind the mounting bracket is maximized when the pivotal portion 94 is swung into its second position.

Figure 2:
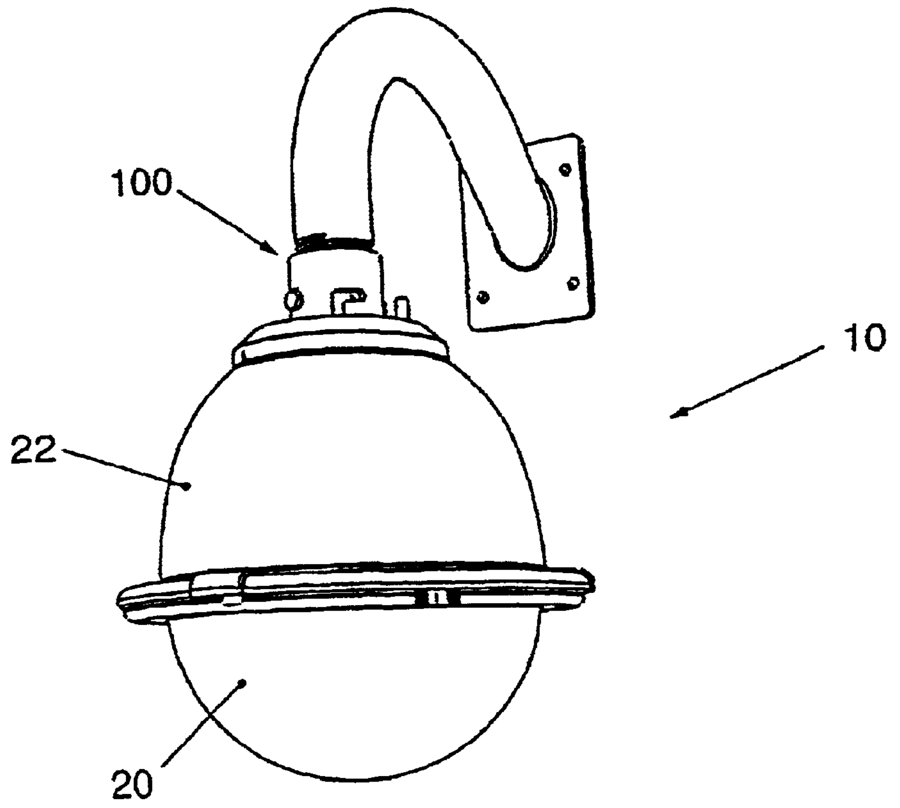
FIG. 2 shows a side view of the camera housing of FIG. 1, mounted to a support structure.

The housing 10 of the present invention preferably further comprises a quick-release coupling 100 for releasably mounting the housing 10 to an external support. The coupling 100 can, for example, secure the housing 10 to an overhead wall mount 102, as shown in FIG. 2.

Figure 6:
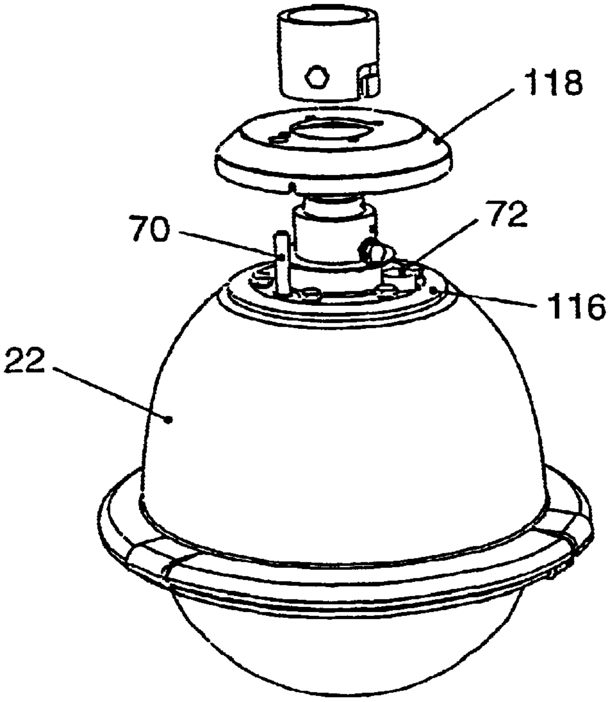
FIG. 6 shows a partially exploded view of the camera housing of FIG. 1, with the upper sealing plate portion separated from the upper housing shell.
Figure 8:
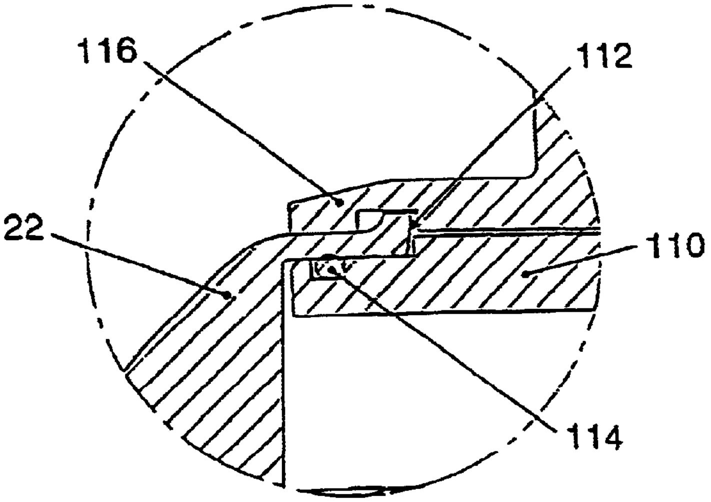
FIG. 8 shows a cross-sectional detail of a sealing arrangement between the upper housing shell and the upper sealing plate of the camera housing of FIG. 1, according to a preferred form.

The fluid valves, electrical coupling, mounting bracket and/or support coupling can be directly affixed to the second housing shell or another part of the housing 10. More preferably, however, the housing further comprises a sealing plate 110 to which one or more of the fluid valves, electrical coupling, mounting bracket and/or support coupling are mounted. As seen with reference to FIGS. 3, 6 and 8, the sealing plate 110 preferably covers an opening 112 through the second housing shell 22 or other part of the housing. A second airtight seal, preferably in the form of an O-ring 114, is provided around the opening 112, between the sealing plate 110 and the second housing shell 22, to prevent pressure loss. The sealing plate 110 is preferably installed inside the second housing shell 22, and an external plate 116 preferably covers the opening 112 outside of the second housing shell and is bolted or otherwise attached to the sealing plate to compress the seal 114 between the sealing plate 110 and the second housing shell 22. A cover plate 118 is preferably installed over the external plate 116 to protect the fluid valves, electrical coupling, and/or other components, and for improved aesthetics.

The housing 10 of the present invention is preferably used in connection with a surveillance camera (unshown) for security or monitoring purposes. The housing 10 is preferably mounted to a support surface in the area to be observed. The first and second housing shells 20, 22 are separated from one another to permit installation of the camera into the interior chamber 12. If necessary, the sealing plate 110 can be separated from the second housing shell 22 for installation and electrical connections. The camera is preferably mounted to the mounting bracket and connected to the internal contacts or pins of the electrical coupling 80. The first and second housing shells 20, 22 are reattached and the seal 24 engaged. The sealing plate 110 is also secured in place and its seal 114 engaged. External wiring is connected to the external contacts or pins of the electrical coupling 80. Pressurized fluid is introduced through valve 70 into the interior chamber 12. Any excess pressure is bled off through the pressure relief valve 72.

While the invention has been described in its preferred forms, it will be readily apparent to those of ordinary skill in the art that many additions, modifications and deletions can be made thereto without departing from the spirit and scope of the invention.

What is claimed is:

1. A pressurizable camera housing, comprising:

a first housing element having a transparent dome with a flange extending therefrom;

a second housing element having a rim releasably coupled to the flange of said first housing element;

a first O-ring engaged between the flange of said first housing element and the rim of said second housing element;

a sealing plate engaged within an opening through said second housing element, whereby said first housing element, said second housing element, and said sealing plate define an interior chamber;

a second O-ring engaged between said sealing plate and said second housing element;

a hermetic electrical coupling for conducting an electrical signal between the interior chamber and an external element;

means for introducing a pressurized fluid into the interior chamber, whereby the housing is capable of maintaining a positive pressure gradient between the interior chamber and the ambient external atmosphere surrounding the housing; and a quick-release coupling for releasably mounting the sealing plate to an overhead support.

2. The pressurizable camera housing of claim 1, further comprising a pressure relief valve for releasing excess pressure from the interior chamber.

3. The pressurizable camera housing of claim 1, further comprising a pivotal mounting bracket within the interior chamber for supporting a camera.

4. The pressurizable camera housing of claim 1, further comprising a retaining ring for releasably coupling the rim of said second housing element to the flange of said first housing element.

5. The pressurizable camera housing of claim 1, wherein the transparent dome of said first housing element is generally hemispherical.

6. The pressurizable camera housing of claim 1, wherein said first O-ring is engaged between the flange of said first housing element and the rim of said second housing element in alignment with wall portions of the first and second housing elements.

7. A pressurizable camera housing comprising a first housing shell having a transparent portion; a second housing shell removably attached to said first housing shell; a sealing plate engaged within an opening through said second housing shell, whereby said first housing shell, said second housing shell, and said sealing plate define an interior chamber;

a quick-release coupling for releasably mounting the sealing plate to an overhead support; and an airtight seal between said first and second housing shells; whereby the housing is capable of maintaining a positive pressure gradient between its internal volume and the ambient external atmosphere surrounding the housing.

8. The pressurizable camera housing of claim 7, wherein said sealing plate comprises a hermetic electrical coupling for conducting an electrical signal between the interior chamber and an external element.

9. The pressurizable camera housing of claim 7, further comprising an inlet valve for receiving a pressurized fluid.

10. The pressurizable camera housing of claim 9, further comprising a pressure relief valve for releasing excess pressurized fluid from said housing.

11. The pressurizable camera housing of claim 7, further comprising a pivotal mounting bracket for supporting a camera within said housing.

12. A pressurizable housing comprising:

a first housing shell that is at least partially transparent;

a second housing shell adapted to engage said first housing shell, whereby said first and second housing shells bound an interior chamber;

sealing means between said first and second housing shells;

means for introducing pressure to the interior chamber;

means for mounting a camera within said interior chamber; and an upper sealing plate engaged within an opening through said second housing shell, said upper sealing plate comprising a coupling for attachment to an overhead support;

whereby the housing is capable of maintaining a positive pressure gradient between the interior chamber and the ambient external atmosphere surrounding the housing.

13. The pressurizable camera housing of claim 12, wherein the transparent portion of said first housing shell comprises a hemispherical dome.

14. The pressurizable camera housing of claim 12, wherein said first housing shell comprises a dome portion with a flange projecting therefrom, and wherein said sealing means is engaged between said first housing element and said second housing element adjacent the intersection of said dome portion and said flange.

15. The pressurizable camera housing of claim 12, wherein said means for mounting a camera comprises a pivotal mounting bracket having a fixed portion attached to said second housing shell, and a pivotal portion hingedly connected to said fixed portion.

16. The pressurizable camera housing of claim 12, further comprising a retaining ring for releasably coupling said first housing shell to said second housing shell.

17. A pressurizable housing comprising:

a first housing shell that is at least partially transparent;

a second housing shell adapted to engage said first housing shell, whereby said first and second housing shells bound an interior chamber;

sealing means between said first and second housing shells;

means for introducing pressure to the interior chamber; and a pivotal mounting bracket for mounting a camera within said interior chamber, having a fixed portion attached to said second housing shell, and a pivotal portion hingedly connected to said fixed portion;

whereby the housing is capable of maintaining a positive pressure gradient between the interior chamber and the ambient external atmosphere surrounding the housing.

18. The pressurizable camera housing of claim 17, wherein the transparent portion of said first housing shell comprises a hemispherical dome.

19. The pressurizable camera housing of claim 17, wherein said first housing shell comprises a dome portion with a flange projecting therefrom, and wherein said sealing means is engaged between said first housing element and said second housing element adjacent the intersection of said dome portion and said flange.

20. The pressurizable camera housing of claim 17, further comprising an upper sealing plate engaged within an opening through said second housing shell, said upper sealing plate comprising a coupling for attachment to an overhead support.

21. The pressurizable camera housing of claim 17, further comprising a retaining ring for releasably coupling said first housing shell to said second housing shell.

* * * * *